No. 753,567. PATENTED MAR. 1, 1904.
W. T. GILES.
STUFFING BOX.
APPLICATION FILED SEPT. 1, 1903.
NO MODEL.
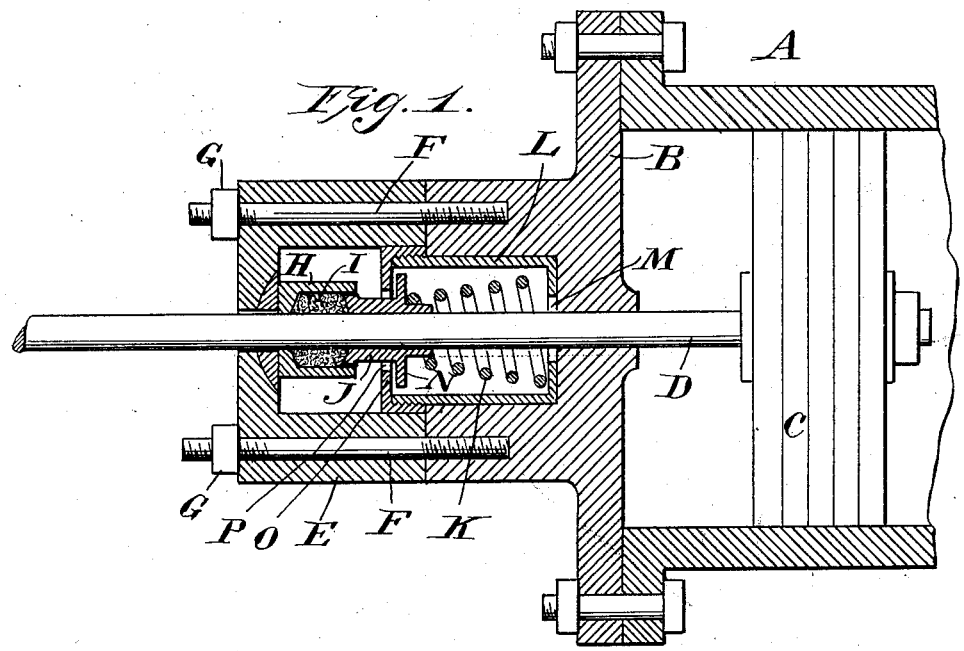
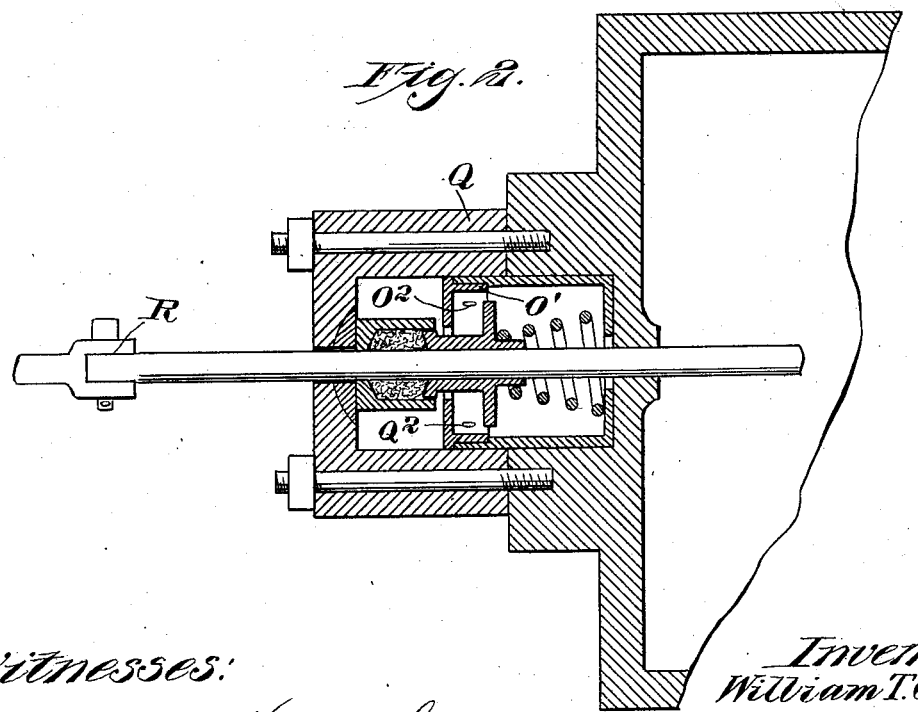
Witnesses:
Louis D. Heinrichs
H. B. Hallock
Inventor
William T. Giles,
By No. 753,567. Patented March 1, 1904.

UNITED STATES PATENT OFFICE.

WILLIAM T. GILES, OF SHAMOKIN, PENNSYLVANIA.

STUFFING-BOX.

SPECIFICATION forming part of Letters Patent No. 753,567, dated March 1, 1904.

Application filed September 1, 1903. Serial No. 171,535. (No model.)

*To all whom it may concern:*

Be it known that I, WILLIAM T. GILES, a citizen of the United States, residing at Shamokin, county of Northumberland, and State of Pennsylvania, have invented a certain new and useful Improvement in Stuffing-Boxes, of which the following is a specification.

My invention relates to a new and useful improvement in stuffing-boxes, and relates to that class of stuffing-boxes in which a spring and follower is located within the gland and exerted against the packing to keep it always packed around the piston or valve rod, and has for its object to provide a cage set within the stuffing-box in which both the spring and follower are located for the purpose of holding the follower in position when the gland is removed to replace the packing.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a longitudinal section through a piston-rod stuffing-box, and Fig. 2 a longitudinal section through a valve-stem stuffing-box.

Referring to Fig. 1, A represents the cylinder, of which B is the head thereof. C is the piston, and D the piston-rod. E is the gland, which is secured in place by means of the studs F, which studs are secured in the heads and pass through the gland, and the gland is secured in place by the nuts G, threaded upon the ends of the studs F. H is the usual loose cup which surrounds the piston-rod and contains the packing I. J is the follower, which is adapted to be held against the packing by means of the spring K.

As far as I have described is the form now used in stuffing-boxes of this description, and it is a well-known fact that when the nuts G are removed for the purpose of removing the gland the pressure of the spring K against the gland will throw the same out with great force, and it requires considerable labor to replace the gland against the pressure of the spring. For the purpose of overcoming this disadvantage I provide a steel cage L, which is open at one end and exteriorly threaded around the outside at that end and is closed at the other end except for the opening M, through which the piston-rod passes. This cage L is inserted within the head of the cylinder, and the spring K is placed within this cage and bears against the closed end thereof. The follower is then placed against the other end of the spring, and this follower has formed on it the annular flange N. A cap O is then threaded upon the screw-threaded end of the cage L, and this cap O has formed through it the opening P, which is large enough to pass over the body of the follower J, but is smaller than the annular flange N. Thus when the gland E is secured in place the follower J will protrude through the opening P in the cap O and bear against the packing I, as usual, and when the packing is new the flange N will be a considerable distance away from the interior of the cap O, and as the packing wears and the spring presses the follower forward to take up for this wear the cap is placed in such a position that the flange N will not come in contact with it until it is necessary to repack the piston-rod, and when it is desired to replace the packing the gland is removed and the spring instead of throwing the follower and the gland outward will force the follower J forward until the flange N comes in contact with the cap O, when it will be held in this position, and then the packing is renewed and the gland again placed in position, and the studs F will be of such a length that the nuts G will secure a hold upon the end of the studs before the follower comes in contact with the packing, and then as the nuts are screwed upon the stud it will force the follower and spring backward as the gland is forced into place.

Another disadvantage in the old form of stuffing-boxes of this character is that sometimes the cup H, which carries the packing, would be carried rearward by the stroke of the piston-rod, and so compress the spring as to injure or break the same; but in my invention this would be impossible, as the rim of the cup H, if it were carried rearward, would come in contact with the cap O, and so prevent the movement of the cup H except the distance equal to the space between the rim of the cup and the cap.

In Fig. 2 I have shown a modification in the form of a cap for the cage. In this form the cap O is provided with a flange O', which fits inside of the cage L, and an annular flange surrounding the cap outside of the flange O' abuts against the edge of the cage. This cap may be secured in place by means of screws or rivets O², passing through the cage and through the flange O'. In this form the opening in the gland may be the same size as the exterior diameter of the cage.

Of course I do not wish to be limited to the exact construction here shown, as slight modifications could be made without departing from the spirit of my invention.

Having thus fully described my invention, what I claim as new and useful is—

1. In combination a reciprocating part, a stuffing-box, a gland, means for securing this gland in place, a receptacle located within the gland and surrounding the reciprocating part, a packing located within the receptacle and surrounding the reciprocating part, a cage located within the stuffing-box, a spring located within the cage and adapted to bear against one end thereof, a follower surrounding the reciprocating part against which the other end of the spring is adapted to bear and force said follower in contact with the packing, a cap formed with or secured to the cage, an opening formed through the center of said cap through which one end of the follower protrudes, an annular flange formed upon that part of the follower within the cage, said flange being of larger diameter than the opening through the cap, substantially as described and for the purpose specified.

2. In a device of the character described, a reciprocating part, a cage located within the stuffing-box, the forward end of said cage being open, the rear end of said cage being closed except for an opening through which the reciprocating part passes, said closed end adapted to rest against the solid portion of the cylinder-head, a cap adapted to be secured over the open end of the cage, a follower surrounding the reciprocating part, an opening formed through the center of said cap through which the follower surrounding the reciprocating part is adapted to protrude, a flange formed upon the follower and located within the cage, the diameter of said flange being larger than the diameter within the opening through the center of the cap, a spring located within the cage and interposed between the follower and the closed end of the cage, as and for the purpose specified.

3. In a stuffing-box of the character described, a reciprocating part, a follower adapted to surround the reciprocating part, a cage located within the stuffing-box and adapted to contain the spring, the rear end of which presses against the rear end of the cage, and the other end against the follower, an opening formed through the other end of the cage through which a part of the follower protrudes to come in contact with the packing, an annular flange formed upon the follower lying within the cage, said flange being of larger diameter than the opening through the end of the cage, substantially as and for the purpose specified.

In testimony whereof I have hereunto affixed my signature in the presence of two subscribing witnesses.

WILLIAM T. GILES.

Witnesses:
WM. E. RESSLER,
L. W. MORRISON.